Nov. 14, 1972  G. MEHNERT  3,702,751

DIEHEAD

Filed May 10, 1971

INVENTOR
GOTTFRIED MEHNERT

United States Patent Office 3,702,751
Patented Nov. 14, 1972

3,702,751
DIEHEAD
Gottfried Mehnert, Berlin, Germany, assignor to Bekum Maschinenfabriken G.m.b.H., Berlin, Germany
Filed May 10, 1971, Ser. No. 141,827
Claims priority, application Germany, May 12, 1970,
P 20 23 008.4
Int. Cl. B29f 3/04
U.S. Cl. 425—190                                           10 Claims

ABSTRACT OF THE DISCLOSURE

A diehead for a plastic extrusion apparatus has an inner annular member provided with a central passage which accommodates a core and defines with the same an annular extrusion clearance for plastic material. An outer annular member surrounds the inner annular member with clearance so that the inner annular member is movable in a plane transverse to the longitudinal axis of the passage within the limitations imposed by this clearance to thereby vary the cross-section of the extrusion passage. One or more adjusting arrangements are provided, each composed of a biasing device located at one circumferential point of the outer annular member and directing upon the inner annular member, and a displacing device located at a point opposite the biasing device and operative for displacing the inner annular member with reference to the outer annular member against the opposition of the biasing device.

BACKGROUND OF THE INVENTION

The present invention relates generally to plastic-forming machines, and more particularly to machines for forming shaped articles of plastic material. Still more specifically the invention relates to an improved diehead which may be utilized in connection with such machine and through which a plastic material is extruded.

Generally speaking, dieheads of this type have an inlet and an outlet connected by a passage, with the outlet providing or being formed with an annular nozzle. Material in plasticized state is advanced through the passage from the inlet into the outlet which latter has an annular clearance.

Dieheads of this type are used for various applications, for instance for producing tubular blanks which are subsequently further processed in a blow molding machine to produce hollow plastic bodies, such as bottles, cans, balls and the like. However, they are also used for other applications.

If the diehead produces blanks for use in blow molding machines, it is important to consider that such machines operate during each operating stroke with a precisely measured and always identical quantity of a pressure medium, by means of which the tubular blank which is formed in the diehead, is blow molded by expanding it to the desired configuration. It is therefore necessary, if the articles are to have a specified and uniform wall thickness—as is almost always the case—that the blank itself be of uniform wall thickness because otherwise the resulting product—obtained by subsequent blow molding of the blank—may have an uneven wall thickness or successive products may be of different wall thickness, and where the wall is too thin the product may tend to break or tear readily, whereas—conversely—where the wall is too thick, excessive material will be used.

Another reason why the article, or rather the blank which is ejected from the diehead, must be of uniform wall thickness is the fact that any irregularity in the wall thickness will immediately result in an axial deviation of the blank on emerging from the diehead. Inasmuch as incremental portions of this blank enter into a form associated with the blow molding machine and in which they are expanded, this is clearly undesirable because an axial deviation of the blank will prevent proper entry into the waiting form or mold. All of this is particularly true if the irregularity is not found over the entire cross-section of the blank but only in a portion thereof, as is usually the case. Of course it should be mentioned that there is not only the proper entry of incremental portions of the blank into the waiting form or mold involved, but also the proper engagement of the increments which have entered into the open mold, by the latter when the mold sections close, proper sealing of the incremental portion in the mold after closing of the latter and at one end, and proper expansion in the mold to the desired blow-molded configuration.

All of these problems have been realized, but it has also been found that in actual practice it is to all intents and purposes impossible to avoid the occurrence of such deviations in the wall thickness of the extruded blank. This realization led to the understanding that if it was not possible to avoid the occurrence, over a period of time, of factors tending to produce such non-uniformity in the wall thickness, it should at least be possible to provide controls with which these factors could then be corrected so that compensation could be made for this occurrence and the wall thickness be re-adjusted to a condition of uniformity. This, of course, should be possible to achieve not only in a simple manner, but also during continued operation of the machine provided with the diehead and at any desired time when such adjustments are necessary. For this purpose the prior art knows an arrangement in which an annular member provided with the extrusion passage in which latter an extrusion core or mandrel is located, can be adjusted by a plurality of radial adjusting screws which were usually arranged pairwise at diametrally opposite locations. With such an arrangement it is merely necessary to loosen two circumferentially adjacent screws and subsequently to tighten the respectively diametrically opposite screws whereby a relative displacement of the core and member provided with the passage takes place, thereby readjusting the cross-sectional configuration of the passage and permitting a localized increase or decrease of the cross-section in compensation for a variation in the wall thickness of the extruded product.

A somewhat simpler arrangement for the same purpose is disclosed in French Pat. No. 1,567,693 in which two adjustable elements are located adjacent one another, and diametrally opposite these respective elements there are provided spring-biased ball members which counteract the action of the adjusting elements so that adjustments can be carried out merely by operating the two adjusting elements rather than having to operate four of them as in the previously mentioned prior-art construction. The principle of adjustment is the same, however, as in that construction.

Although these prior-art constructions appear to provide an answer to the problem outlined above, they are possessed of certain disadvantages. In particular, in many apparatuses of the type utilizing such arrangements the lower edge of the diehead and thereby the extrusion nozzle with the holding ring for the nozzle are located immediately adjacent movable components. For instance, where blow-molding machines for molding hollow bodies are concerned, sections of shaping or forming dies are movable immediately adjacent the extrusion nozzle, severing devices which sever the respectively leading increment of the tubular blank on or upon entry into the blow-molding die, blow and calibrating devices which are movable in the axial direction of the extrusion nozzle, and similar components. All of this makes it difficult for an operator to obtain access to the adjusting elements which must be manipulated in order to vary the cross-section of the extrusion passage and thereby compensate for deviations in the wall thickness of the extruded blank. Even if access is possible, there is the constant danger of injury to the operator if such adjustments are to be carried out during operation of the machine, and if protective shields are provided which are to prevent contact of the operator with the movable components, access in most cases is totally impossible to the adjusting devices.

U.S. Pat. No. 3,535,739 discloses a construction which avoids this difficulty. It provides a holding ring with horizontal diametrally opposite bores accommodating respective bolts which act upon the annular member provided with the extrusion passage. These bolts are operated by wedge surfaces provided at the ends of rods which pass through the diehead in vertical direction from the upper end to the lower end of the diehead and which are coupled with one another in such a manner that upwards movement of one rod results in a downwards movement of the diametrally opposite rod. This means that whenever one of the rods is moved, one of the bolts or pins acting for adjustment purposes is moved radially inwardly and the other is moved radially outwardly, thereby permitting the necessary adjustment. Access to the rods is thus possible at a location remote from the outlet nozzle, and thus danger to the operator for movable components located exteriorly adjacent the outlet nozzle is no longer a problem. However, this prior-art construction is necessarily relatively complicated and therefore expensive. In addition, its complexity necessitates many individual components and it goes without saying, of course, that the greater the number of components in a device, the more susceptible such a device will be to malfunction.

Furthermore, dieheads made in accordance with the just-discussed prior art construction must be manufactured to precise tolerances, and such dieheads must be specially made in order to be capable of accommodating the adjusting arrangement outlined above. This means that it is not possible to utilize the type of adjusting arrangement disclosed in the aforementioned U.S. patent in conjunction with already existing dieheads which have not been specially made to precise tolerances for this purpose.

SUMMARY OF THE INVENTION

Accordingly, it is an object of the present invention to overcome the aforementioned drawbacks and disadvantages of the prior art.

Still a further object of the present invention is to provide such a diehead with a simple and reliable arrangement for effecting the type of adjustment outlined above, and which can be applied even to existing dieheads.

A concomitant object of the invention is to provide such an arrangement which permits operation for effecting the necessary adjusting functions, from a location remote from the extrusion nozzle and therefore remote from any movable components located adjacent the nozzle, which actuation can be carried out manually or in a simple manner with an uncomplicated remote control arrangement.

In pursuance of the above objects, and of others which will become apparent hereafter, one feature of the invention resides in a diehead for use in a machine for forming shaped articles, which comprises, briefly stated, an inner annular member having an outer circumferential surface, an inlet, and an outlet connected with the inlet by a passage. A core is provided in the passage and defines therewith an annular clearance. An outer annular member surrounds the inner annular member with slide clearance and has an inner and an outer peripheral surface. Biasing means acts on the inner annular member at least at one circumferential location thereof in direction transversely of the axis of the passage. At least one adjusting pin slidably extends through the outer annular member opposite the circumferential location in abutment with the outer circumferential surface of the inner annular member, and has an outer end portion projecting outwardly beyond the outer peripheral surface. Displacing means acts upon the outer end portion of the pin for displacing the latter longitudinally of itself.

In other words, the pin or pins will have an axial length which is greater than the distance between the outer circumferential surface of the inner annular member and the outer peripheral surface of the outer annular member.

The novel features which are considered as characteristic for the invention are set forth in particular in the appended claims. The invention itself, however, both as to its construction and its method of operation, together with additional objects and advantages thereof, will be best understood from the following description of specific embodiments when read in connection with the accompanying drawing.

DESCRIPTION OF THE PREFERRED EMBODIMENTS

Figure 1:
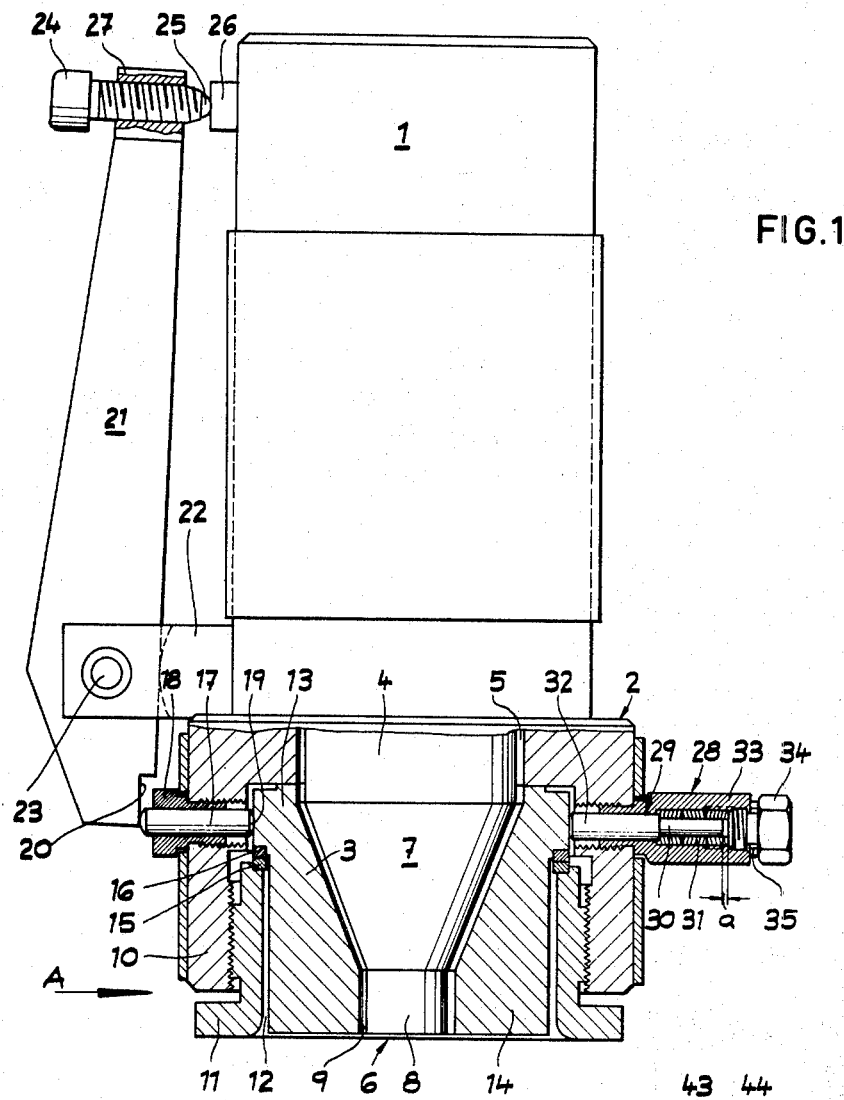
FIG. 1 is an illustration of one embodiment of the invention, partly in side view and partly in section.

Before entering into a detailed description of the drawing it is emphasized that the present invention is suitable for use in conjunction with all dieheads for machines forming shaped articles from plastic material. However, inasmuch as it has been discussed above with respect to overcoming the disadvantages existing in prior-art constructions constituting a part of a blow-molding apparatus in which the diehead produces tubular blanks, the present invention will hereafter be discussed with reference to FIGS. 1 and 2 in the context of a blow molding machine, that is I have illustrated in FIGS. 1 and 2 dieheads which are of the type producing tubular blanks, which can be supplied to other components of a blow-molding machine. I wish to emphasize again, however, that this is not to be considered limiting in any sense and that the invention is suitable for use with any type of diehead irrespective of the particular cross-sectional configuration of the article which is extruded through it, and irrespective of whether the article is subsequently supplied to other components characteristic of a blow molding machine or whether it is supplied to other machines or even constitutes a finished article on extrusion from the diehead.

Keeping this in mind, and discussing firstly the embodiment illustrated in FIG. 1, it will be seen that reference numeral 1 designates the top portion or block of the diehead, carrying a holding member or ring 2 which constitutes an outer annular member. Located within the ring 2 is an inner annular member 3 provided with an inlet (at the top) and an outlet (at the bottom) which are connected by a passage. Located in this passage is a core or mandrel 4 which defines with the inner circumferential surface bounding this passage an annular clearance 5 through which plasticized material is extruded to issue from the outlet nozzle 6 which is for instance defined by the lower cylindrical portion 8 of the core 4 whose upstream portion conically diverges to this portion 8, and the inner surface of the inner annular member 3 which surrounds the core and defines in the region of the outlet end of the passage of the latter an annular extrusion gap 9.

In the illustrated embodiment the outer annular member 2 is composed of two threadedly connected annular sections, namely the inner annular section 11 and the outer annular section 10. The manner in which they are threadedly connected is clearly illustrated. The inner annular section 11 surrounds the predominant portion of the inner annular member 3 and defines with the latter a clearance 12 by means of which relative displacement of the inner annular member 3 relative to the outer annular member 2, and concomitant variations in the cross-sectional dimensions of the clearance 5, are made possible.

The inner annular member 3 has an upper flange-like or shoulder-like portion 13 and a lower portion 14. The upper axial end face of the inner annular section 11 is provided with a recess in which a preferably ground and hardened ring member 15 is accommodated in fixed relationship. A further recess is provided at that side of the shoulder 13 which faces the upper axial end face of the inner annular section 11, and accommodates a second ring 16 corresponding to the ring 15 and supported on the latter. The rings 15 and 16 are normally in registry and are always in abutment.

One or more adjusting pins 17 are accommodated slidably in bushings 18 which are threaded into the outer annular section 10 (only one pin 17 and one bushing 18 are illustrated), and the inner preferably rounded end faces 19 of the pin 17 abut against the flange-like portion 13 of the inner annular member 3. The axial length of the pins 17 is greater than the radial distance between the outer perpheral surface of the outer annular section 10 and the outer circumferential surface of the inner annular member 3, as is clearly evident. As a result of this the outer end portions of pins 17 radially outwardly beyond the outer peripheral surface of the outer annular section 10 where they are abutted by a pressure face 20 provided on an adjusting or control member which is here illustrated as a double-armed lever 21. In the illustrated embodiment the lever 21 is pivotably mounted for pivoting movement about a pivot 23 in a bifurcated member 22 which is suitably secured, as by welding, to the block 1. The longer arm of the lever 21 extends from the pivot 23 rearwardly away from the outlet nozzle 6 and carries at its free end an adjusting screw 24 whose preferably rounded or ball-shaped free end portion 25 abuts against the pressure plate 26 provided on the block 1, as by welding. To this and the free end portion of the lever arm 21 is provided with a threaded bushing 27 through which the screw 24 is threaded and it will be understood that, when the screw 24 is turned in a sense displacing it deeper into the bushing 27, the lever arm 21 will be pivoted about the pivot 23 in outward direction, so that its lower arm acts upon the pin 17 displacing the latter in the direction of the arrow A, that is radially inwardly of the annular members 2 and 3. The result is that the inner annular member 3 slides with its ring 16 on the ring 15, becoming radially displaced with reference to the annular member 2 and the core 4 by a very small distance corresponding to the reduction ratio afforded by the differential of the lever arms. This results in a change in the cross-sectional configuration of the clearance 5 in the plane of the drawing.

The displacement of the member 3 with reference to the members 2 and 4 displace against the action of a restoring or biasing device which is generally identified with reference numeral 28. In the illustrated embodiment this device comprises a pin 29 which is stepped and has a portion 30 of smaller diameter surrounded by biasing spring means, and a portion 32 of larger diameter whose inner end face abuts against the portion 13 of the member 3 and is slidably accommodated in a radial bore provided in a bushing 33 which is threaded into another radial bore in the outer annular section 10. In the illustrated embodiment the biasing spring means is in form of one or more sets of Belleville springs or dished springs 31 (three illustrated) which are guided in an enlarged portion of the bore formed in the bushing 33. A screw 34 is threaded into the outer end portion of the bushing 33 and acts upon the spring means to thereby vary the pretension afforded by the latter. Ring members 35, such as washers or the like, may be inserted between the inner end face of the screw and the outer end face of the sleeve 33 to permit exact adjustment of the spring pretension. It goes without saying, of course, that other springs besides Belleville springs can be utilized.

In the normal or usual operating position of the inner annular member 3 a gap $a$ must exist between the inner end of the portion 30 and the inner end face of the screw 34, and this gap $a$ must correspond to the maximum permissible displacement of the member 3 with reference to the member 2.

The screw 24 is clearly located in such a manner that it is remote from the outlet nozzle 6 and any movable components which may be provided (not illustrated) in the region adjacent this outlet nozzle. As a result of this the screw 24 can be operated, and the necessary adjustment of the member 3 can be effected, without danger to an operator even while the machine is in full operation.

It will be appreciated that in order to obtain the necessary adjustments which are contemplated, there must ordinarily be provided at least two circumferentially spaced ones of the pins 17, of course together with the associated arms 21 and adjusting screws 24 with the components associated with the latter, and at least one of the biasing or restoring devices 28 must be provided. In most cases it will, however, be preferable to provide at least two pairs of such arrangements, each pair composed of a pin 17 and the associated components, an arm 21 and screw 24 and the associated components, and a device 28 located diametrally opposite the pin 17, with the two pairs acting on the member 3 at right angles to one another.

Figure 2:
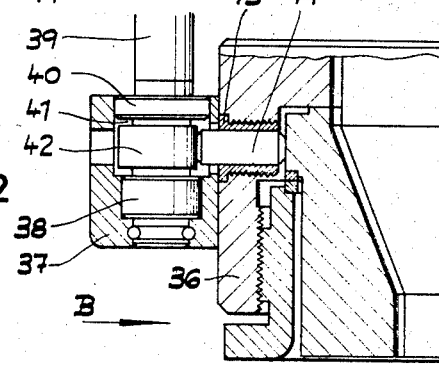
FIG. 2 is a fragmentary axial section through a diehead such as shown in FIG. 1, but illustrating a further embodiment of the invention.

In FIG. 2, which in other respects resembles FIG. 1 so that most of the components have not been illustrated, I have shown that the arm 21 can be eliminated and replaced with an excenter to effect movement of the pins 17. All other components, as already pointed out, may be the same as those shown in FIG. 1.

In the embodiment of FIG. 2 the outer annular portion or member is identified with reference numeral 36 and carries an excender housing 37 in which there is journalled with a shoulder 38 the end portion of a turnable shaft 39. The latter is guided in a bore 41 of the housing 37 by means of a guide ring 40 which may also be replaced by an anti-friction bearing mounted in the housing.

Intermediate the ring 40 or a bearing replacing the same, and the shoulder 38 the shaft 39 is configurated as an excenter 42, that is it has an excentric portion 42. As a consequence, when the shaft 39 is turned, the excentric portion 42 acts upon the outer end of the pin 44 which is slidably accommodated in a bushing 43, displacing the pin 44 in the direction of the arrow B, or of course if the portion 42 frees the pin 44, the latter can be displaced opposite this direction by the non-illustrated restoring device.

Of course, everything that has been said above with respect to FIG. 1, and the possibilities for arrangements of the various components, is true also of FIG. 2 and it is further emphasized that both the lever 21 and the shaft 39 may be operated not only manually but also via suitable drives, for instance via suitable electromotors which transmit motion by means of other levers, gears or the like. This makes it possible to remote-control the lever 21 or the shaft 39. Also, the respective pins and the associated restoring devices need not be located on a common axis, or in a common plane, because deviations relative to one another in axial direction of the passage as well as in lateral direction are possible to at least some extent without adversely affecting the operation.

It is still emphasized that the manner of mounting the member 3, and the manner in which it is displaceably supported on the associated rings 15 and 16, is simply advantageous but is not controlling of the operability and utility of the invention. The member 3 can for instance be in the manner known for instance from U.S. Pat. No. 3,535,739 of two sections separated by a recess with the upper section being fixedly mounted and the lower having a certain freedom of movement relative to it by means of which its adjustment within the limits imposed by the surrounding holding ring (corresponding to the member 2) is possible.

It will be understood that each of the elements described above, or two or more together, may also find a useful application in other types of constructions differing from the types described above.

While the invention has been illustrated and described as embodied in a diehead, it is not intended to be limited to the details shown, since various modifications and structural changes may be made without departing in any way from the spirit of the present invention.

Without further analysis the foregoing will so fully reveal the gist of the present invention that others can by applying current knowledge readily adapt it for various applications without omitting features that, from the standpoint of prior art, fairly constitute essential characteristics of the generic or specific aspects of this invention and, therefore, such adaptations should and are intended to be comprehended within the meaning and range of equivalence of the following claims.

What is claimed as new and desired to be protected by Letters Patent is set forth in the appended claims:

1. A diehead for use in a machine for forming shaped articles, comprising an inner annular member having an outer circumferential surface, an inlet, and an outlet connected with said inlet by a passage; a core in said passage and defining therewith an annular clearance; an outer annular member surrounding said inner annular member with slight clearance and having an inner and an outer peripheral surface; biasing means acting on said inner annular member at least at one circumferential location thereof and in direction transversely of the axis of said passage; at least one adjusting pin slidably extending through said outer annular member opposite said circumferential location in abutment with said outer circumferential surface and having an outer end portion projecting outwardly beyond said outer peripheral surface; and displacing means acting upon said outer end portion for displacing said pin longitudinally of itself.

2. A diehead as defined in claim 1, wherein said displacing means comprises an arm having one terminal section in abutment with said outer end portion, a spaced second terminal section, and being pivoted intermediate said terminal sections for displacement about a pivot axis extending transversely of the elongation of said pin.

3. A diehead as defined in claim 2, said displacing means further comprising actuating means acting upon said second terminal section for pivotally displacing said arm.

4. A diehead as defined in claim 1, said outer annular member having at least one radial bore accommodating said pin; and further comprising a bushing in said bore surrounding said pin.

5. A diehead as defined in claim 1, said outer annular member having a radial bore; and wherein said biasing means comprises a stepped pin in said bore and having a larger diameter portion abutting said outer circumferential surface, a smaller diameter portion, and biasing spring means surrounding said smaller diameter portion.

6. A diehead as defined in claim 5, said spring means comprising at least one set of Belleville springs.

7. A diehead as defined in claim 5, said biasing means further comprising a threaded member acting upon said spring means and operable, in response to requisite turning, for varying the tension of said spring means.

8. A diehead as defined in claim 3, wherein the distance from said pivot axis to said second terminal section is larger than from said pivot axis to said one terminal section.

9. A diehead as defined in claim 1, said displacing means comprising a turnable shaft coaxial with said passage and extending adjacent to said outer end portion of said pin, and an eccentric mounted on said shaft for turning movement therewith.

10. A diehead as defined in claim 1, said outer annular member comprising an inner and an outer annular section coaxial and connected with one another, said inner annular section having an axial endface directed toward but spaced from said inlet and provided with an annular recess facing toward said inlet, said inner annular member having a radial outer shoulder juxtaposed with said recess and having a similar annular recess facing towards said outlet; and a pair of abutting glide rings each received in part in one of said annular recesses and having juxtaposed axial faces which abut one another.

References Cited

UNITED STATES PATENTS

| 3,102,302 | 9/1963 | Moore | 425—466 |
| 3,221,371 | 12/1965 | Stevens | 425—465 |
| 3,416,190 | 12/1968 | Mehnert | 425—192 |
| 3,608,136 | 9/1971 | Tripptrap | 425—466 |

J. SPENCER OVERHOLSER, Primary Examiner

M. O. SUTTON, Assistant Examiner

U.S. Cl. X.R.

65—183; 72—263; 425—466